C. RUSH.
WRENCH.
APPLICATION FILED SEPT. 19, 1911.
1,076,319.
Patented Oct. 21, 1913.
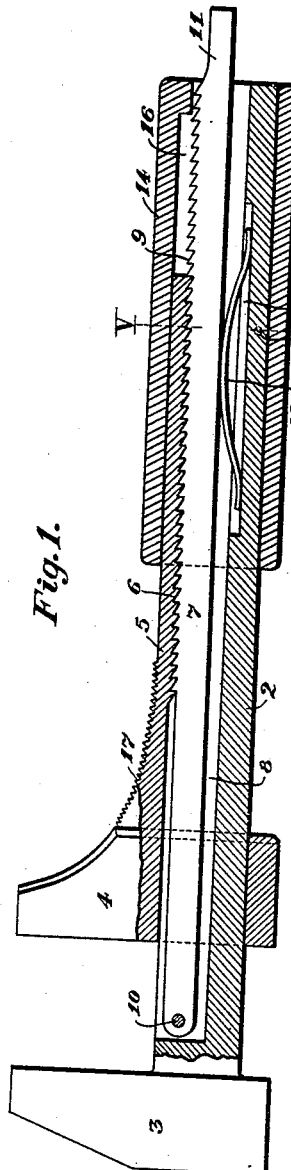
Fig. 1.
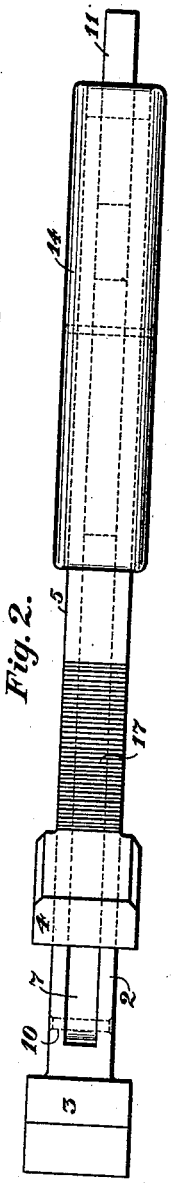
Fig. 2.
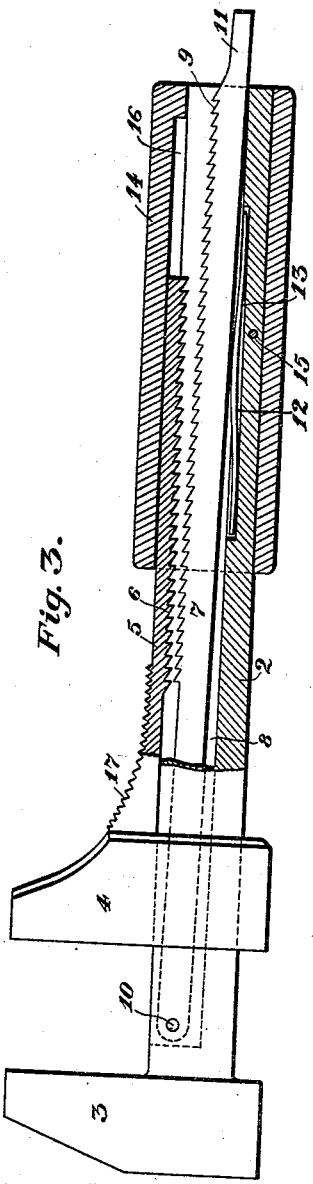
Fig. 3.
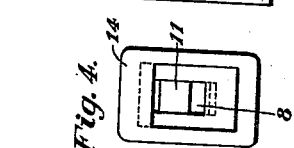
Fig. 4.
Fig. 5.
Witnesses:
Inventor:
Charles Rush
by C. M. Clarke
his Attorney

UNITED STATES PATENT OFFICE.

CHARLES RUSH, OF PITTSBURGH, PENNSYLVANIA, ASSIGNOR OF ONE-HALF TO BENJAMIN M. HANNA, OF PITTSBURGH, PENNSYLVANIA.

WRENCH.

1,076,319. Specification of Letters Patent. Patented Oct. 21, 1913.

Application filed September 19, 1911. Serial No. 650,294.

*To all whom it may concern:*

Be it known that I, CHARLES RUSH, a citizen of the United States, residing at Pittsburgh, in the county of Allegheny and State of Pennsylvania, have invented certain new and useful Improvements in Wrenches, of which the following is a specification.

My invention consists of an improvement in quick acting wrenches and has for its object to provide a simple, economical and efficient device, consisting of few parts, capable of quick and positive adjustment and adapted to positively retain its position when set.

The device consists of a main shank provided with a terminal jaw, a sliding jaw longitudinally mounted on the main shank, provided with a series of locking teeth, and locking arm mounted in the main shank with a pressure spring and projecting outwardly through the rear end thereof with an operating handle, constructed and adapted to operate in the manner more fully hereinafter set forth.

In the drawings: Figure 1 is a longitudinal sectional view of the device, partly in elevation, in normal position. Fig. 2 is a plan view of Fig. 1. Fig. 3 is a view similar to Fig. 1 showing the locking arm retracted for adjustment of the movable jaw. Fig. 4 is an end view of the handle of Fig. 1. Fig. 5 is a cross section on the line V, V, of Fig. 1.

The main shank 2 of the wrench is a rectangular bar, preferably of steel, having at its outer end the usual jaw 3. Slidingly mounted upon shank 2 is the adjustable jaw 4 which embraces it as to its main body portion, and is provided with an inwardly projecting locking extension 5 having on its inner surface a series of ratchet teeth 6.

7 is the locking arm extending longitudinally through the interior of the shank 2 and within a receiving cavity 8 therein, with sufficient clearance space behind the locking arm to admit of it being pressed sufficiently far from the series of teeth 6 to disengage therefrom, as shown in Fig. 3. Said locking arm 7 is provided on its front surface with a corresponding series of teeth 9, adapted to normally interlock with teeth 6, as shown in Fig. 1, to hold the jaw 4 against backward movement. The locking arm is pivotally or otherwise mounted in the outer end of the cavity 8 of shank 2 as shown at 10, and projects by finger terminal 11, through the inner end of the shank for operation by the finger or thumb. A thin leaf spring 12, preferably mounted in a longitudinal recess 13 along the inner side of shank 2, forming an extension of cavity 8, normally presses locking arm 7 forwardly into engagement with teeth 6 of shank 5 in whatever position said shank may assume. The handle 14 embraces the inner end of shank 2, being secured thereto in any suitable manner as by pin 15, and is slotted for almost its entire length, as indicated at 16, for clearance for the longitudinally movable shank 5. The front face of shank 5, immediately within jaw 4, is provided with a series of serrations or checker projections 17, filling the concave groove of the base of the jaw, for easy and positive engagement by the thumb of the hand of the operator, when holding the handle 14.

The operation of the device will be obvious from the foregoing description. By grasping the wrench by its handle, the jaw 4 may be advanced to make contact with the nut, etc., riding forwardly over the teeth 9 which positively hold the jaw against backward movement. When it is desired to release the jaw 4, or to adjust it backwardly to any desired position the terminal 11 is depressed against the pressure of spring 12 by the finger or by pressing said terminal against any resisting surface, when the locking arm 7 assumes the position as shown in Fig. 3, whereupon the jaw may be thrust backwardly to any desired point. By holding the wrench vertically with the jaw's uppermost and releasing jaw 4, it will drop by gravity and may be then pressed forwardly for another operation.

The device is extremely simple and strong in construction, of few parts, not liable to get out of order, and will be found to provide an efficient and quickly adjustable tool. It may be changed or varied by the skilled mechanic, in different features of detail construction or design or size, but all such changes are to be considered as within the scope of the following claims.

What I claim is:

1. In a wrench of the class described, the combination of a main shank having a terminal jaw and a longitudinal cavity, a handle embracing and fixedly secured to the other end of said shank, a longitudinally movable jaw embracing said shank provided with a locking extension projecting into said handle and having a series of locking teeth on its inner side, a depressible locking arm within the longitudinal cavity of the main shank pivotally connected therewith adjacent to its terminal jaw, extending inwardly beyond the end of the handle and having a series of locking teeth along its front edge, and a spring adapted to normally throw the teeth of said locking arm into engagement with the teeth of the locking extension of the movable jaw, substantially as set forth.

2. In a wrench of the class described, the combination of a main shank having a terminal jaw and a longitudinal cavity having a sub-cavity provided with end shoulders for a leaf spring, a handle embracing and fixedly secured to the other end of said shank, a longitudinally movable jaw embracing said shank provided with a locking extension projecting into said handle and having a series of locking teeth on its inner side, a depressible locking arm within the longitudinal cavity of the main shank pivotally connected therewith adjacent to its terminal jaw, extending inwardly beyond the end of the handle by an integral finger extension, and having a series of locking teeth along its front edge, and a leaf spring set in said sub-cavity exerting pressure against the locking arm to hold its teeth in engagement with the teeth of the movable jaw extension, substantially as set forth.

In testimony whereof I hereunto affix my signature in the presence of two witnesses.

CHARLES RUSH.

Witnesses:
C. M. CLARKE,
PETER GLICK.

Copies of this patent may be obtained for five cents each, by addressing the "Commissioner of Patents, Washington, D. C."